Figure 1:
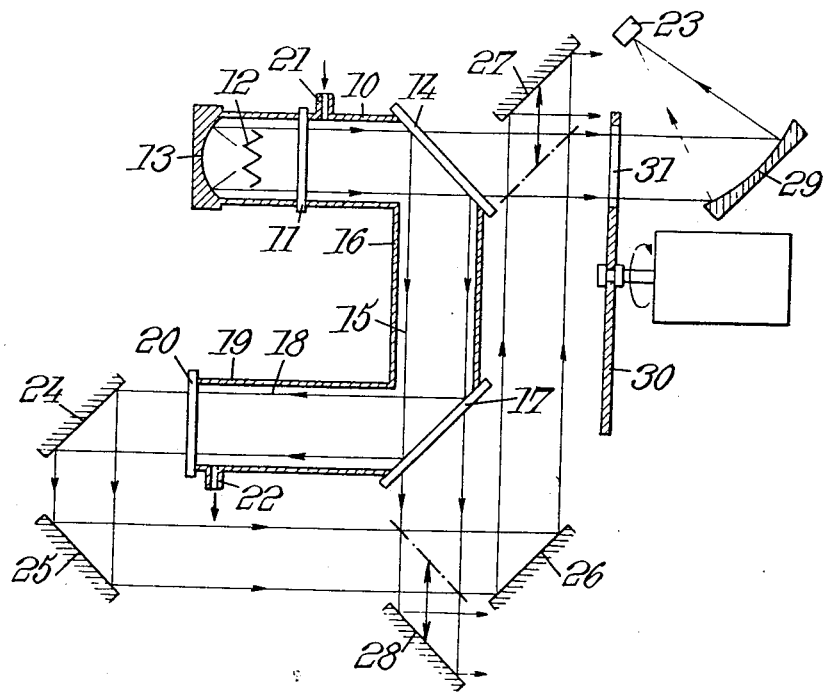

United States Patent [19]
Joly

[11] 3,797,942
[45] Mar. 19, 1974

[54] METHOD AND APPARATUS FOR ANALYSIS BY LIGHT ABSORPTION SPECTROMETRY

[75] Inventor: Bertrand Joly, Ville Davray, France

[73] Assignee: Sourian & Cie, Boulogne-Billancourt, France

[22] Filed: Dec. 11, 1972

[21] Appl. No.: 313,623

[30] Foreign Application Priority Data
Feb. 4, 1972 France............................ 72.003895

[52] U.S. Cl..................... 356/181, 250/343, 356/51, 356/183, 356/184, 356/189, 356/201, 356/205
[51] Int. Cl. ... G01j 3/46, G01n 21/34, G01n 21/06
[58] Field of Search............. 356/51, 173, 180, 181, 356/183, 184, 186, 189, 201, 204, 205, 206; 250/343, 344, 345, 346

[56] References Cited
UNITED STATES PATENTS
2,941,444  6/1960  Frykman................................ 356/51

*Primary Examiner*—Ronald L. Wibert
*Assistant Examiner*—V. P. McGraw
*Attorney, Agent, or Firm*—Larson, Taylor and Hinds

[57] ABSTRACT

The invention relates to the analysis of gas by light absorption, suitable for use in analysing the exhaust gasses of automobile engines. The device comprises a tank receiving the gas to be analysed and in which a source sends a beam of light. It comprises at least one interferential filter placed on the path of the beam and at an angle, not of 90°, with this latter, the said filter transmitting the larger portion of the energy of the beam to a detector in a predetermined band of wave lengths and reflecting into the tank the larger portion of the remaining energy in the form of a reflected light beam.

10 Claims, 5 Drawing Figures

PATENTED MAR 19 1974  3,797,942

SHEET 1 OF 2

METHOD AND APPARATUS FOR ANALYSIS BY LIGHT ABSORPTION SPECTROMETRY

The invention concerns the analysis of gas by light absorption, especially of infrared light.

Gas analysers of nondispersive infrared absorption are already known. Most of them employ two beams of light. One beam is passed through a tank occupied by the gas to be analysed, the other is passed through a tank occupied by a reference gas, generally nitrogen. An interferential filter, of which the pass band corresponds to the absorption band of the constituent to be monitored in the gas, is placed in front of a detector on which a modulator alternately sends the beam of light having traversed the gas to be analysed and that having traversed the reference gas. Such an analyser has numerous shortcomings. In particular, it is specific to one gas to be analysed.

It is an object of the invention to provide a method and a device for gas analysis by nondispersive light absorption, especially infrared light, improved with respect to the prior art, especially by the fact that they are at the same time simple and allow monitoring several constituents.

For this purpose, there is provided a method of gas analysis by absorption, wherein an incident light beam is made to pass into a tank occupied by the gas; the fraction of the beam in a predetermined wave length range is transmitted towards a detector through an interferential filter having a pass band corresponding to an absorption band of a constituent to be detected in the gas; and the same filter is used for reflecting the remainder of the beam to the interior of the tank, towards another filter in an oblique direction with respect to the incident direction. The light reflected one or several times by one or more filters each corresponding to an absorption band of a constituent to be detected can be directed towards a detector, which can be the first-named detector used alternately.

It is another object of the invention to provide a gas analyser adapted to put into operation the above-mentioned method, comprising a tank adapted to receive a gas to be analysed and in which a source emits a light beam, especially an infrared light beam. At least one interferential filter is placed on the path of the beam. This filter makes an angle, not of 90°, with the direction of the beam, and transmits to a detector the larger part of the energy of the beam in a predetermined wave length band and sends back, into the tank, the remaining energy in the form of a reflected beam. This reflected beam can be recaptured by a second filter having a different pass band from that of the first. In this case, the filters give a path in broken line, in a plane or in different planes to the beam in the tank.

The beam reflected successively by one or several filters can leave the tank by a nonselective wave length window. The exit window at 90° incidence can be replaced by an interferential filter having a pass band which corresponds either to an absorption band of one of the constituents of the gas to be analysed, or to a zone without absorption band. In the first instance, a light selector allows the light transmitted by any one of the filters (including that replacing the exit window) to be directed towards a single detector. In the second instance, where the analyser can be considered as practically reconstituting a double beam analyser, a light modulator emits alternately, to the same detector, the beams coming from the exit window and from one of the filters and a phase-lock amplifier controls, until counterbalancing, an attenuator placed on the path of the beam coming from the exit window.

Figure 3:
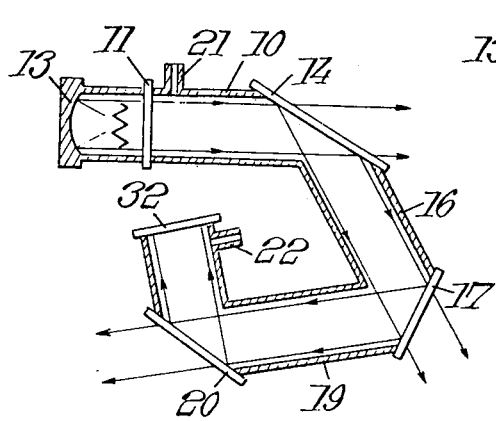
Figure 4:
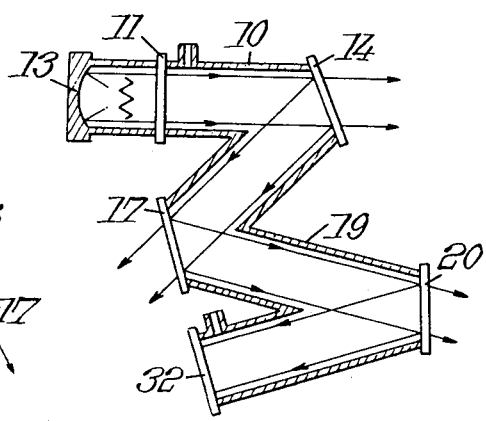
Figure 2:
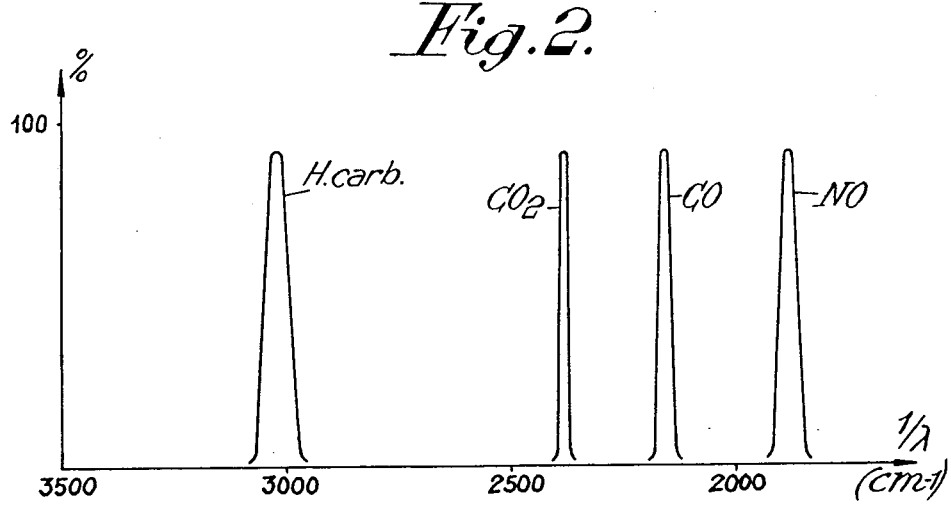
Figure 5:
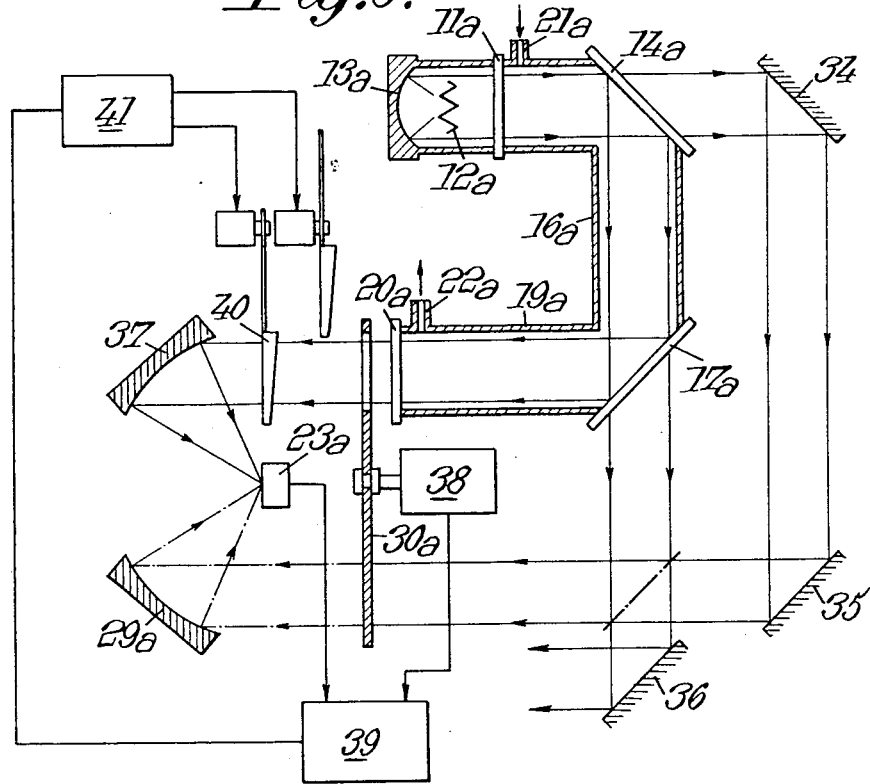

The invention will be better understood from a consideration of the following description of analysers, constituting preferred embodiments of the invention given by way of nonlimiting example. The description refers to the accompanying drawings, in which:

FIG. 1 is a drawing of the basic constituents of an analyser with a single beam and with three interferential filters, enabling the dosage of three gas constituents to be analysed;

FIG. 2 gives, in simplified manner, the location of the pass bands of the filters (represented larger than in reality for more clarity);

FIGS. 3 and 4 show respectively how to produce a convex path and a zigzag path for lengthening of the distance covered by the light in the tank, while retaining a small volume;

FIG. 5, similar to FIG. 1, shows an analyser with a pseudo-double beam allowing the dosage of two constituents of the gas to be analysed.

The analyser illustrated diagrammatically in FIG. 1 comprises a U-shaped tank. The end portion of one of the branches 10 of the tank is closed by a window 11 transparent to infrared radiation, for example in calcium fluoride. An infrared light source 12, constituted for example by an incandescent lamp, provides a light beam that a concave mirror 13 transforms into a parallel beam which penetrates into the tank through the window 11. The incident light beam thus constituted is received, under an incidence which is, in the embodiment illustrated, of 45°, by an interferential filter 14. This filter is provided to transmit, towards a detector, the light energy contained in a pass band which corresponds to the absorption band of one of the constituents to be monitored in the gas contained in the tank. It must be taken into consideration that the pass band of the filter depends upon the incidence angle of the beam. The transmission spectrum obviously shifts as a whole towards the shorter wave-lengths when a normal incidence is passed to an oblique incidence.

The filter 14 operates as an almost perfect mirror for the wave-lengths on both sides of the pass band. The beam 15 reflected by the filter 14 follows the bottom of the tank, the orientation of the filter being chosen for this purpose. This reflected beam falls upon a second interferential filter 17 having a different pass band than that of the first and chosen to correspond to the absorption band of another constituent to be dosed. It goes without saying that this feature implies that the absorption bands of the diverse constituents to be dosed do not coincide completely. In the case of partial overlap, the corresponding filters will have pass bands which are substantially in the portions not common to the absorption bands.

The second filter 17 also sends back energy not transmitted in the form of a beam 18 along the second branch 19 of the tank. This beam falls upon a last filter 20, which in the embodiment of FIG. 1, corresponds again to another constituent. The light which leaves is then, if necessary, directed towards a detector, as will be seen below.

The tank is provided in conventional manner with an inlet 21 for the introduction of the gas to be analysed and with an outlet 22, allowing a circulation of this gas to be established.

The light beam leaving the filter 20 is sent towards the detector 23 by an optical system diagrammed in the form of three flat, fixed mirrors 24, 25 and 26 and of a mirror 27, when this latter occupies the position illustrated by dash-dots in FIG. 1.

The mirrors 24, 25 and 27, as well as a second movable mirror 28, constitute a light distributor allowing to send to the detector 23, after reflection and focalisation by a concave mirror 29, either the light beam which leaves by the filter 14, or that which leaves by the filter 17, or that which leaves by the filter 20. When the mirrors occupy the position illustrated in FIG. 1, it is the light transmitted by the filter 14 that is sent to the detector 23. When the mirror 27 is brought to its low position, indicated by dash-dot line, it is the light leaving the filter 20 and reflected first by the flat mirrors 24, 25 and 26 which is sent to the detector 23. Finally when the two mirrors 27 and 28 are in the positions illustrated by dash-dots, it is the beam transmitted by the filter 17 which arrives to the detector.

The detector 23, not being selective, can be of any one of several types. It can consist of a pneumatic detector (Golay cell). There are advantageously used, however, photodiode detectors, phototransistor, photoresistance or even semi-conductor composite detectors, so-called pyroelectric.

On the path followed by the three beams before focalisation on the detector 23, is interposed a light modulator 30 constituted by a rotative disc pierced with openings 31. The presence of this modulator allows itself to be independent, in a large measure, of the continuous ambient light by associating the detector 23 to a phase-lock detector assembly, which can be of conventional type.

An important advantage of the invention is brought out from the preceding description: the length of the path traveled by the light leaving each filter can be adapted to the absorption of the gas for the corresponding wave-length band. In a more precise manner, there can be imposed upon the light beam, before leaving by the corresponding filter, an optical path inversely proportional to the absorption of the corresponding constituent of the gas. This advantage is obtained with a sole gas flow circuit and with a practically minimum volume of the tank, which reduces the response time to the composition variations of the gas and enables the calibration of the device for all the dosage constituents of the gas simultaneously. The same advantage would not be obtained with a device comprising several tanks of different lengths; either being separated (since in this case valves are necessary in order to change the circuit of gas when the analysis of one constituent is passed to that of another) or being integrated (in which case the volume put into operation is very large and the commutation implies adding of many system components).

By way of example, it can be indicated that an analyser of the type defined above had been produced to observe the content of carbon monoxide, of carbon dioxide and nitrogen oxides of the exhaust gasses of automobile engines. The general arrangement is similar to that illustrated in FIG. 3, and the members corresponding to those of FIG. 1, bear the same reference numerals. The successive filters met by the light beams correspond to the absorption band of $CO_2$, to that of CO and to those of the nitrogen oxides, respectively. These pass bands are diagrammatically illustrated in FIG. 2. The first interferential filter (14 in FIG. 3) has a band of about 0.05 microns in width (band outside of which the transmission coefficient is less that 1%), centered to 4.33 microns and corresponding to the absorption line to 4.30 microns of the carbonic gas. The exhaust gasses containing 8 to 15% of $CO_2$, which absorbs much in this band, has led to give the first arm of the tank (10 in FIG. 3) a length of 2.5 cm. There has been provided an absorption path of 21 cm in front of the second filter, having a pass band of 0.12 microns centered at 4.55 microns, which has led to give to the bottom 16 a length of 17.5 cm which is well suited for a CO content going up to 10%. Finally, the filter 20 corresponding to the pass band for the nitrogen oxides has a width of 0.2 microns centered at 5.33 microns. There has been provided a length of optical path of 41 cm before exit by this filter, optimal value for a content of the order of 1/10,000. Consequently, the third section 19 of the tank has been given a length of 19 cm. In order to prevent the residual light from being retained in the tank, the filter 20 of FIG. 3 is mounted with an oblique incidence and sends back its nontransmitted light towards a nonselective exit window 32.

The arrangement of the filters of FIG. 3 can be regarded as following a convex polygon. It leads to make the filters work under relatively strong incidences. The advantages of the invention can be conserved by diminishing the value of the incidence angles if the filters are arranged in a manner as to give a zigzag path to the light beams. Such an arrangement is illustrated in FIG. 4, where the elements corresponding to those of FIG. 3 still bear the same reference numerals. It goes without saying that the arrangement of the branches is not necessarily in even plane.

A supplementary filter can be added to the device illustrated in FIGS. 1, 3 and 4 for example to dose the unburnt hydrocarbons in the exhaust gasses, in addition to carbon dioxide, carbon monoxide and nitrogen oxides.

The devices of FIGS. 1, 3 and 4 can be considered as operating with a single beam. On the contrary, that which is illustrated in FIG. 5 can be considered as artificially reconstituting a double beam operation. In FIG. 5, where the members corresponding to those already represented bear the same reference numerals with the index $a$, there is again found a U-shaped tank and two interferential filters 14a and 17a of which the transmission bands correspond to those of two constituents to dose in the gas occupying the tank. The beam transmitted by the filter 14a is sent to the detector 23a by two flat, fixed mirrors 34 and 35 and a concave focalisation mirror 29a, for as long as this beam is not blocked. This blocking is produced when a plane mirror 36 is moved from the low position where it is represented in FIG. 5 to a high position (in dash-dots) where it sends to the detector, by the intermediary of the concave mirror 29a, the beam having traversed the interferential filter 17a.

In the embodiment of FIG. 5, the exit window 20a is constituted by an interferential filter having a pass band near to those of the filters 14a and 17a but not corresponding to any intense absorption band of a constituent of the gas to be analysed. A concave mirror 37 concentrates the beam leaving by the window 20a onto the detector 23a. The beams arriving onto the mirrors 29a and 37 are blocked alternatively by a modulator 30a operated by a motor 38. The electric signal provided by the detector 23a (for example a photoresistance detector) is applied to a phase-lock detector 39 to which the motor 38 sends a reference signal. This detector controls a light attenuator device 40, represented in FIG. 5 in the form of an absorbant edge, until the intensities received by the detector coming from the mirror 29a and the mirror 37 are balanced. At equilibrium, the displacement undergone by the attenuator device 40 from its rest position gives an indication of the absorption undergone by the beam by reason of one of the constituents. In FIG. 5 two absorbant edges have been represented, each corresponding to one of the filters 14a, 17a. A commutator 41 enables the orientation of the feedback signal coming from the phase-lock detector 39 towards the control mechanism of one or the other of these attenuator devices.

While the diagram of FIG. 5 is slightly more complicated than that of FIGS. 1, 3 and 4, it has the advantage of being unaffected by variation of the light intensity from the source 12a and to minimize the effects of turbulence inside the tank. This diagram can be modified by supressing the attenuator devices, by displaying the error signal provided by the phase-lock detector 39 after amplification.

In all the embodiments which have been illustrated, the filters constitute the exit windows of the tank. If one of the constituents of the gas contained inside the tank is corrosive and detrimental to the filter, the latter can be separated from the tank by a transparent window, which, however, will be advantageously arranged to receive light under normal incidence, so as to minimize reflections.

I claim:

1. Method of gas analysis by light absorption, wherein a beam of incident light is made to pass into a tank occupied by the gas; the fraction of the beam in a range of predetermined wave lengths is transmitted towards a detector through an interferential filter having a pass band corresponding to an absorption band of a constituent to be detected in the gas; the same filter is used for reflecting the remainder of the beam in an oblique direction with respect to the incident direction and to the interior of the tank, towards at least one other filter having a pass band different from that of the first; and there is diverted towards a detector — which can be the first, used alternately or in differential — the light reflected one or several times by one or more of the filters.

2. Gas analyser by light absorption, comprising a tank for receiving the gas to be analysed, a source for directing a light beam into the tank, at least one interferential filter placed on the path of the beam and making an angle not of 90° with said filter, the said filter transmitting to a detector the larger portion of the energy of the beam in a predetermined wave length band and reflecting into the tank the larger portion of the energy remaining in the form of a reflected beam.

3. Analyser according to claim 2, wherein several filters having different transmission bands are placed successively along the path of the beam, giving to this latter in the tank a path in broken line, in zigzag or convex polygon, in a plane or in different planes.

4. Analyser according to claim 3, wherein the filters are arranged in such an order that the light in a pass band which is less absorbed by the gas than the light in another pass band has a path within the tank larger than the path of the light in the latter pass band.

5. Analyser according to claim 2, wherein the tank comprises a nonselective wave length exit window.

6. Analyser according to claim 2, comprising a single detector and a light distributor which directs the light beams transmitted by the filters towards the detector in alternance.

7. Analyser according to claim 2, wherein the tank comprises an interferential reference filter having a pass band different from those of the other filters and not corresponding to any of the intense absorption bands of the gas, and a light modulator alternately directs the light leaving the tank through the reference filter and the light leaving the tank through one of the other filters, to the detector.

8. Analyser according to claim 7, comprising a phase-lock amplifier associated to the detector and receiving a reference signal from the modulator in order to eliminate background noise.

9. Analyser according to claim 7, including an attenuator placed on the beam transmitted through the exit window, means to adjust the attenuation of said attenuator in order to balance the beams arriving to the detector, and means to measure the absorption of the attenuator or a parameter which is related to it.

10. Analyser according to claim 2, wherein the filter or each filter constitutes an exit window from the tank for the corresponding transmitted beam.

* * * * *